United States Patent Office 3,541,412
Patented Nov. 17, 1970

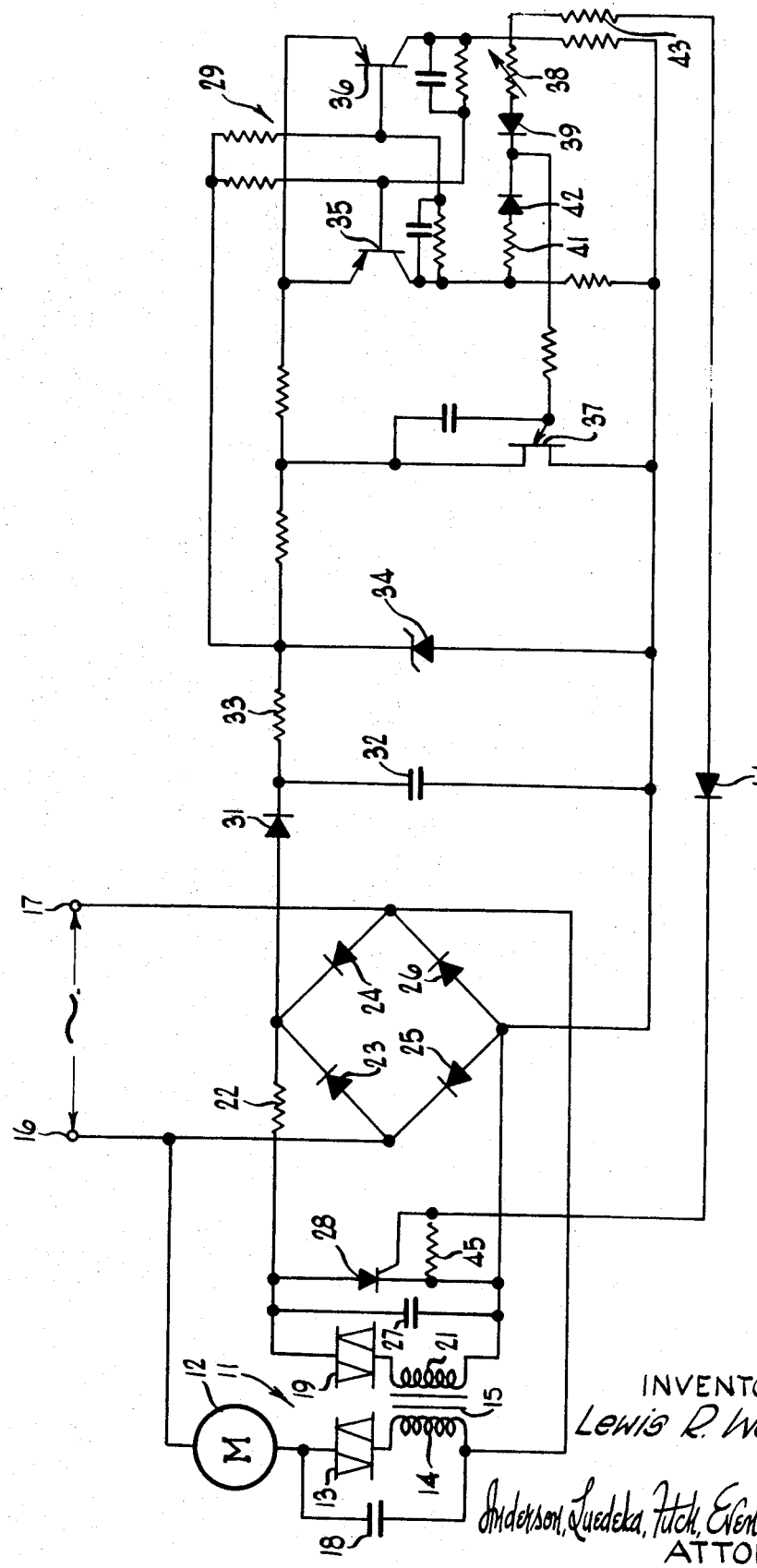

3,541,412
CONTROL FOR ALTERNATING-CURRENT MOTORS
Lewis R. Worth, Deerfield, Ill., assignor to Cole-Parmer Instrument and Equipment Company, Chicago, Ill., a corporation of Illinois
Filed Sept. 13, 1967, Ser. No. 667,488
Int. Cl. H02p 7/62
U.S. Cl. 318—227        7 Claims

ABSTRACT OF THE DISCLOSURE

A speed control for an alternating-current motor is described. Power for the motor is interrupted for preselected periods in order to vary the average power supplied to the motor. The periods which are selected are of sufficient length to present full rated voltage to the motor during the power period.

---

This invention relates to the control of alternating-current motors and, more particularly, to a speed control for an alternating-current motor.

Many types of speed controls for alternating-current motors are known in the art. The speed control of induction type motors, such as shaded pole motors, is often accomplished by controlling the magnitude of the voltage applied to the motor. Because such motors exhibit a significant loss of torque at voltages less than their rated voltage, controlling speed by controlling voltage in the aforesaid manner may not be satisfactory under many circumstances.

Another way in which speed control of induction type A-C motors is sometimes accomplished is by interruption of each A-C cycle applied to the motor for a predetermined and regulatable segment of its duration. This may not be entirely satisfactory for many purposes since, if the "off" period extends through the peak of the power pulse for the A-C cycles, full rated voltage may not be presented to the motor with a consequent fall-off in torque.

It is an object of this invention to provide an improved speed control for alternating-current motors.

Another object of the invention is to provide a speed control for an alternating current motor which maximizes available torque at all speeds.

A further object of the invention is to provide a speed control for an alternating-current motor which avoids loss of torque by presenting the full rated voltage to the motor on a time proportioned basis.

Other objects of the invention will become apparent to those skilled in the art from the following description taken in connection with the accompanying drawing, consisting of a single figure which is a schematic diagram of a speed control constructed in accordance with the invention.

Very generally, the speed control of the invention comprises switch means 11 operable between a conductive and a nonconductive condition to interrupt power supplied to the motor. The switch means are operated periodically between conductive and nonconductive conditions, with the duration in the conductive condition being sufficient to present full rated voltage to the motor during the conductive period of the switch means.

Referring now more particularly to the drawing, the speed control illustrated therein is for controlling the speed of an alternating-current induction type motor 12 such as a shaded pole motor. The motor 12 is connected in series with a symmetrical avalanche diode 13 and with the secondary winding 14 of a transformer 15, across the terminals 16 and 17 of a source of alternating current. The diode 13 is of the type which switches from a high impedance state or condition to a low impedance state or condition upon the application of a sufficiently high voltage thereto. In the low impedance condition the diode conducts current in both directions. Such devices are presently commercially available.

When the diode 13 is in its low impedance state, alternating current flows through the motor 12, thus supplying power to the motor for driving same. When the diode 1 is in its high impedance state, A-C current to the motor is interrupted and power is removed. The action therefore is that of a switch operable between a conductive and a nonconductive condition to interrupt power supplied to the motor. A capacitor 18 of relatively small capacity is connected across the diode 13 and the secondary winding 14, for a purpose hereinafter explained. Its capacity should be sufficiently small so that only a minimal current flows through the motor.

The switch means 11 also include a further symmetrical avalanche diode 19 series connected with the primary winding 21 of the transformer 15 and with a resistor 22, across the pulsating D-C output of a full wave bridge rectifier consisting of diodes 23, 24, 25 and 26. The input of the bridge rectifier is connected across the terminals 16 and 17 of the A-C source. The pulsating D-C output is filtered by the resistor and a capacitor 27 which capacitor is connected in parallel with the diode 19 and the primary winding 21. The output of the full wave bridge rectifier 23–26 is selected to provide a voltage across the diode 19 which exceeds the threshold or breakdown level of the avalanche diode 19.

A silicon controlled rectifier 28 is connected across the diode 19 and the primary winding 21, parallel therewith. When the controlled rectifier 28 is in the nonconductive condition, the voltage across the capacitor 27 is applied to the diode 19, causing it to conduct through the primary winding 21 of the transformer 15. When the controlled rectifier 28 is conductive, however, the voltage across the capacitor 27 is shunted from the diode 19 and primary winding 21. Thus, when the controlled rectifier 28 is rendered nonconductive, a pulse is applied through the primary winding 21 and appears in the secondary winding 14 of the transformer 15. The pulse appearing in the secondary winding 14 exceeds the threshold level of the diode 13 thereby allowing it to go into a conductive state. The capacitor 18 facilitates consistent and reliable triggering and commutation operation.

Speed control for an alternating current motor in accordance with previously known techniques has, as previously mentioned, frequently resulted in a loss of torque in the motor at low speeds. In accordance with the invention, the switch means are operated periodically between conductive and nonconductive conditions to control the speed of the motor 12. Moreover the duration of the conductive condition of the switch means is sufficient to allow at least one cycle of A-C to be applied to the motor 12 to provide full rated voltage to the motor during the conductive period of the switch means.

In order to accomplish the foregoing action, the conduction of the controlled rectifier 28 is controlled by a timing circuit 29. D-C operating current for the timing circuit is derived across the output of the bridge rectifier 23–26 and is applied to the timing circuit through a steering diode 31 and a ripple filter consisting of a shunt capacitor 32 and a series resistor 33. Steady level operating voltage for the timing circuit 29 is established by the breakdown voltage drop across a reverse biased Zener diode 34.

The timing circuit 29 includes a pair of PNP transistors 35 and 36, connected in a bistable multivibrator circuit, and a unijunction transistor 37. Suitable biasing resistors and associated capacitors, not numbered, are provided. A timing circuit substantially as shown and described herein is shown and described on pages 337–339 of the General Electric Company publication entitled, "Transistor Manual," seventh edition. As mentioned in the cited publication, the collector circuits are tied to the unijunction transistor 37 through a resistor 38 and diode 39 and through a resistor 41 and diode 42, respectively. Also as indicated in the cited publication, nonsymmetrical operation of the multivibrator is obtained by making variable at least one of the resistors 38 and 41 in the collector circuits of the transistors 35 and 36. In the embodiment illustrated herein, the resistor 38 is variable.

The output of the timing circuit 29 is derived at the collectors of the transistors 35 and 36 and consists substantially of a square wave. The square wave output from the collector of the transistor 36 is applied through a resistor 43 and a diode 44 to the gate of the controlled rectifier 28. A gate resistor 45 is connected between the gate and cathode of the controlled rectifier.

The on-versus-off time of the square wave pulses at the collector of the transistor 36 is controlled by adjusting the variable resistor 38. The fixed resistor 41 is set to give a preselected off-time for the timing circuit output applied to the gate of the controlled rectifier 28. The off-time determined by the resistor 41 is selected to be sufficiently long that the controlled rectifier 28 will remain nonconductive long enough that one or more full cycles of alternating current are applied to the motor 12. In this manner, full rated voltage is applied to the motor during the conductive period of the switch means 11.

The on-time of the timing circuit 29 output applied to the gate of the controlled rectifier 28 is selected by varying the resistor 38 in accordance with the desired speed for the motor. With the controlled rectifier 28 conducting, the alternating current is not applied to the motor 12. In this manner, the average current to the motor 12 may be controlled for controlling the speed thereof, while still permitting the motor to develop full torque.

It may therefore be seen that the invention provides an improved speed control for an alternating current motor. The speed of the motor is easily regulated without a consequent fall-off in the torque at slower speeds due to a fall-off in the voltage applied to the motor.

Various modifications of the invention in addition to those shown and described herein will become apparent to those skilled in the art from the foregoing description and accompanying drawing. Such other modifications are intended to fall within the scope of the appended claims.

What is claimed is:

1. A speed control for an alternating-current motor, comprising means supplying alternating-current power to said motor, switch means connected between said supplying means and said motor and operable between a conductive and a nonconductive condition to interrupt power supplied to the motor, and means for operating said switch means periodically between conductive and nonconductive conditions with the duration in the conductive condition being sufficient to supply at least one full cycle of said alternating power to the motor during the conductive period of said switch means, said operating means including a bistable multivibrator and means for varying the duration of at least one stable state of said multivibrator.

2. A speed control for an alternating-current motor, comprising means supplying alternating-current power to said motor, switch means connected between said supplying means and said motor and operable between a conductive and a nonconductive condition to interrupt power supplied to the motor, means for operating said switch means periodically between conductive and nonconductive conditions with the duration in the conductive condition being sufficient to supply at least one full cycle of said alternating power to the motor during the conductive period of said switch means, said switch means being operable in a conductive condition during application of voltage thereto and said operating means including further switch means operable to a conductive condition for shunting voltage from said switch means to operate same to the nonconductive condition.

3. A speed control according to claim 2 wherein said further switch means is operable in a conductive condition upon application of voltage pulses thereto and wherein a timing means is provided for applying voltage pulses to said further switch means for operating same.

4. A speed control according to claim 3 wherein said timing means includes a bistable multivibrator having means for varying the width of said voltage pulses applied to said further switch means.

5. A speed control for an alternating-current motor, comprising switch means operable between a conductive and a nonconductive condition to interrupt power supplied to the motor, means for operating said switch means periodically between conductive and nonconductive conditions with the duration in the conductive condition being sufficient to present full rated voltage to the motor during the conductive period of said switch means, said switch means comprising a transformer having a primary and a secondary, a symmetrical avalanche diode connected in series with said primary of said transformer for connection across a source of pulsating direct current, and a second symmetrical avalanche diode connected in series with said secondary of said transformer for connection in series with the motor across an alternating current source.

6. A speed control according to claim 5 wherein said operating means includes a controlled rectifier connected across said first symmetrical avalanche diode and said primary winding of said transformer for shunting current therefrom.

7. A speed control according to claim 6 including a bistable multivibrator for applying trigger pulses to said controlled rectifier.

References Cited

UNITED STATES PATENTS

| | | | |
|---|---|---|---|
| 3,192,462 | 6/1965 | James | 318—345 |
| 3,243,677 | 3/1966 | Cannalte et al. | 318—345 |
| 3,348,109 | 10/1967 | Wright | 318—227 XR |
| 3,355,647 | 11/1967 | Bravs | 318—227 XR |

ORIS L. RADER, Primary Examiner

G. Z. RUBINSON, Assistant Examiner

U.S. Cl. X.R.

318—230, 345